US012595130B2

(12) United States Patent
Su et al.

(10) Patent No.: US 12,595,130 B2
(45) Date of Patent: Apr. 7, 2026

(54) OBJECT CONVEYING SYSTEM

(71) Applicants: Taiwan Daifuku Co., Ltd., Tainan (TW); DAIFUKU CO., LTD., Osaka (JP)

(72) Inventors: Chiaying Su, Tainan (TW); Kyota Inazumi, Tainan (TW)

(73) Assignees: Taiwan Daifuku Co., Ltd., Tainan (TW); DAIFUKU CO., LTD., Osaka (JP)

( * ) Notice: Subject to any disclaimer, the term of this patent is extended or adjusted under 35 U.S.C. 154(b) by 140 days.

(21) Appl. No.: 18/780,412

(22) Filed: Jul. 22, 2024

(65) Prior Publication Data

US 2025/0289667 A1 Sep. 18, 2025

(30) Foreign Application Priority Data

Mar. 13, 2024 (TW) ................................. 113109291

(51) Int. Cl.
B65G 17/00 (2006.01)

(52) U.S. Cl.
CPC ................................. B65G 17/005 (2013.01)

(58) Field of Classification Search
CPC .... B65G 17/16; B65G 17/005; B65G 1/0457; B65G 49/061; H01L 21/67733; H01L 21/67736
See application file for complete search history.

(56) References Cited

U.S. PATENT DOCUMENTS

| 5,163,545 | A | * | 11/1992 | David | E21F 13/02 |
| | | | | | 198/588 |
| 2020/0198900 | A1* | | 6/2020 | Hartmann | B65G 41/003 |
| 2025/0002251 | A1* | | 1/2025 | Inazumi | H01L 21/67733 |

FOREIGN PATENT DOCUMENTS

| CN | 102576688 | B | * | 1/2015 | ....... H01L 21/67769 |
| CN | 111212797 | A | * | 5/2020 | ....... H01L 21/67733 |
| CN | 112825304 | A | * | 5/2021 | ....... H01L 21/67733 |
| CN | 117067923 | A | * | 11/2023 | ........... B65G 1/0457 |
| JP | 2021080079 | A | * | 5/2021 | ............. B65G 35/00 |
| WO | WO-2021197867 | A1 | * | 10/2021 | ............. B66C 19/00 |

* cited by examiner

*Primary Examiner* — Emmanuel M Marcelo
(74) *Attorney, Agent, or Firm* — JCIPRNET

(57) ABSTRACT

The disclosure discloses an object conveying system which includes an object conveying apparatus and a mounting table. The object conveying apparatus includes a traveling member, the vehicle member, and a transporting member. A rail which extends along a horizontal direction is disposed between the object conveying system and the mounting table. A horizontal moving mechanism of the vehicle member moves back and forth along the rail. The rail includes a first rail and a second rail having different horizontal heights in an up-down direction and extending along the horizontal direction. While the horizontal moving mechanism is moving to the side away from the object conveying apparatus, a first wheel of the horizontal moving mechanism moves along the first rail, and a second wheel of the horizontal moving mechanism moves along the second rail.

4 Claims, 6 Drawing Sheets

OBJECT CONVEYING SYSTEM

CROSS-REFERENCE TO RELATED APPLICATION

This application claims the priority benefit of Taiwanese application serial no. 113109291, filed on Mar. 13, 2024. The entirety of each of the above-mentioned patent applications is hereby incorporated by reference herein and made a part of this specification.

BACKGROUND

Technical Field

The disclosure relates to an object conveying system, and in particular to an object conveying system that improves the tilt issue when a horizontal moving mechanism is moving.

Description of Related Art

In existing object conveying systems, an object conveying apparatus moves between different stopping points to convey objects. When the object conveying apparatus stops at the stopping point, a vehicle member of the object conveying apparatus is moved to the mounting table located in the horizontal direction to perform operations of picking up and setting down objects. However, when the vehicle member approaches the mounting table, the wheels of the horizontal moving mechanism on the vehicle member (the wheels closer to the mounting table in the horizontal direction) generates impacts and vibrations when entering along the bridging portion of the rail. In order to suppress the vibration, the rail is dropped to a lower position than it originally was, causing the vehicle member to become tilted after completely entering the mounting table.

SUMMARY

The disclosure provides an object conveying system that can keep a vehicle member stably entering a rail and reduce the impact when entering the rail.

The object conveying system of the disclosure includes an object conveying apparatus and a mounting table configured adjacent to the object conveying apparatus. The object conveying apparatus includes a traveling member, a vehicle member, and a transporting member. The traveling member is configured on a traveling rail to move along a traveling direction. The vehicle member is disposed below the traveling member and includes a horizontal moving mechanism moving along a horizontal direction and a lifting mechanism moving alone an up-down direction. The transporting member is disposed below the lifting mechanism. A rail extending along the horizontal direction is configured between the object conveying apparatus and the mounting table. The horizontal moving mechanism moves back and forth along the rail between the object conveying apparatus and the mounting table in the horizontal direction. The horizontal moving mechanism is provided with a first wheel on one side in the horizontal direction and a second wheel on another side. The rail includes a first rail and a second rail having different horizontal heights in the up-down direction and extending along the horizontal direction. When the horizontal moving mechanism moves in a direction away from the object conveying apparatus in the horizontal direction, the first wheel moves along the first rail, and the second wheel moves along the second rail.

In an embodiment of the disclosure, from a perspective of viewing in the horizontal direction, the first wheel and the second wheel are disposed adjacent to each other in the traveling direction. From a perspective of viewing in the up-down direction, the first rail and the second rail are disposed adjacent to each other in the traveling direction.

In an embodiment of the disclosure, from a perspective of viewing in the horizontal direction, the first rail and the second rail are formed in a stepped shape with step differences.

In an embodiment of the disclosure, from a perspective of viewing in the horizontal direction, the first wheel and the second wheel are located at the same position in the traveling direction, and from a perspective of viewing in the up-down direction, the second rail is formed in a range overlapping with the first rail. When the horizontal moving mechanism moves to the mounting table along the horizontal direction, the first wheel and the second wheel are located between the first rail and the second rail.

Based on the above, in the object conveying apparatus of the object conveying system of the disclosure, the first rail and the second rail are different in horizontal heights. In the horizontal moving mechanism of the vehicle member, the first wheel moves along the first rail, and the second wheel moves along the second rail. In this way, when the horizontal moving mechanism approaches the mounting table, the horizontal moving mechanism may move along the first rail via the first wheel in the original tilted posture and be supported by the first rail without changing the angle or height suddenly. Accordingly, the object conveying system of the disclosure can keep the vehicle member stably entering the rail and reduce the impact when entering the rail.

DESCRIPTION OF THE EMBODIMENTS

Figure 1A:
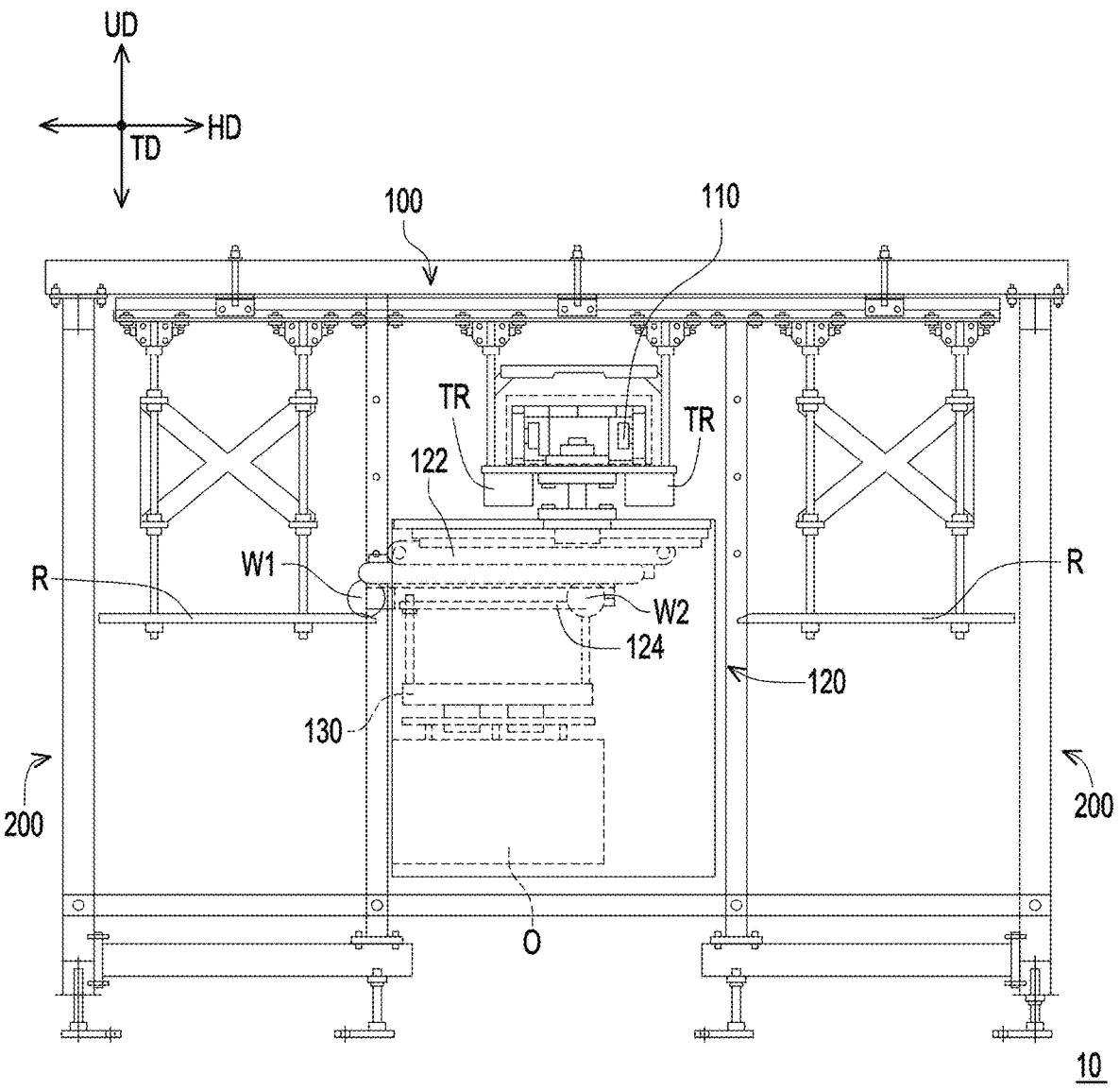
FIGS. 1A and 1B are schematic views of an object conveying system of the disclosure in different operating states.
Figure 1B:
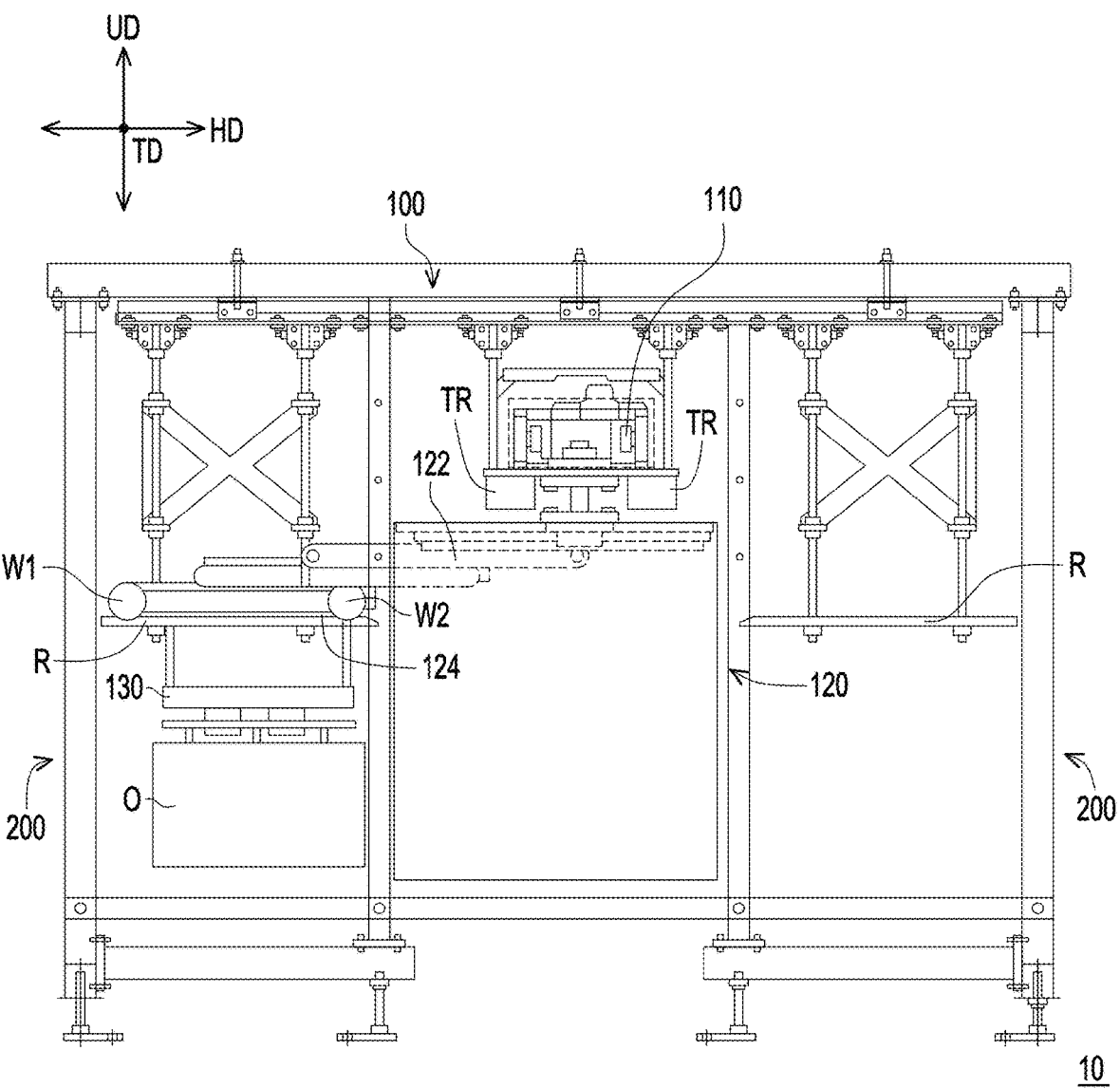
Figure 2:
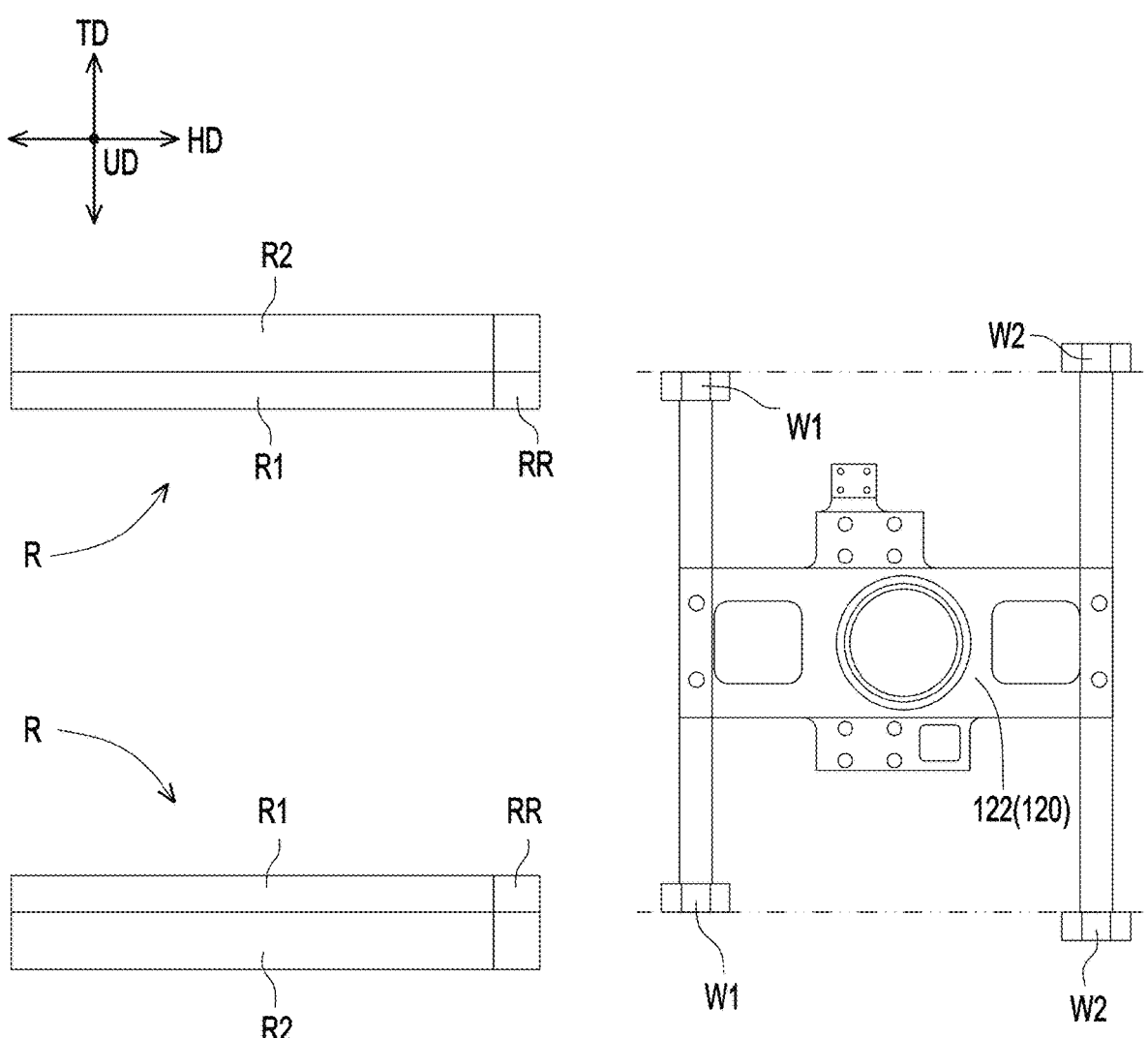
FIG. 2 is a top view of a horizontal moving mechanism of an object conveying apparatus before entering a rail in an embodiment of the disclosure.
Figure 3:
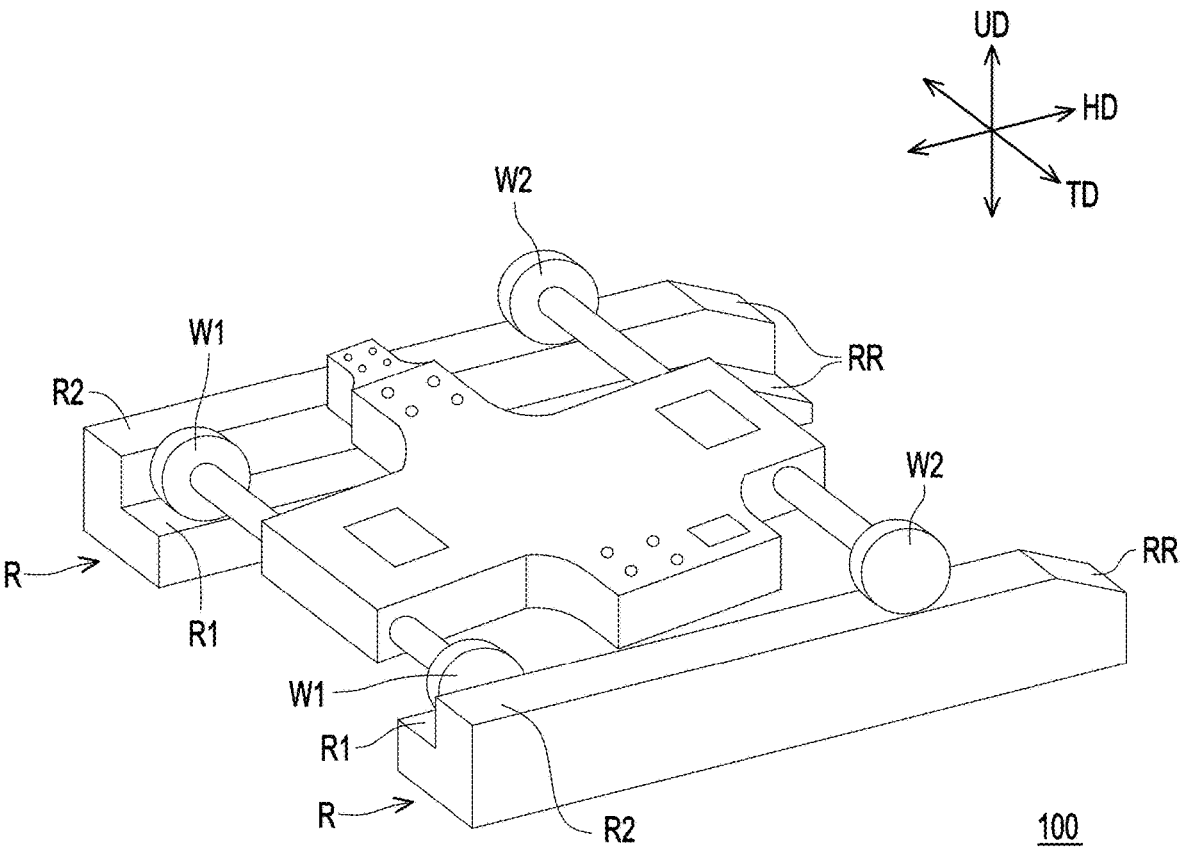
FIG. 3 is a schematic perspective view of the horizontal moving mechanism in FIG. 2 after entering the rail.

FIGS. 1A and 1B are schematic views of an object conveying system of the disclosure in different operating states. FIG. 2 is a top view of a horizontal moving mechanism of an object conveying apparatus before entering a rail in an embodiment of the disclosure. FIG. 3 is a schematic perspective view of the horizontal moving mechanism in FIG. 2 after entering the rail. In this embodiment, an object conveying system 10 conveys an object O (e.g., a wafer, etc.) to various stopping points in a semiconductor factory, for example, to improve overall production efficiency. However, in other embodiments not shown, the object conveying system 10 may also be applied in other working areas suitable for conveying objects, and the disclosure is not limited to the above situation. The object conveying system 10 includes an object conveying apparatus 100 and a mounting table 200 configured adjacent to the object conveying apparatus 100. Furthermore, for example, the object conveying apparatus 100 moves along a traveling direction TD (as shown in a vertical direction of FIGS. 1A and 1B) on a traveling rail TR connecting each of the stopping points, and stops between the two mounting tables 200 in a horizontal direction HD (as shown in a left-right direction of FIGS. 1A and 1B). Therefore, when the object conveying apparatus 100 stops at the stopping point, it is equivalent to the mounting table 200 being configured adjacent to the object conveying apparatus 100. That is, in the object conveying system 10, the object conveying apparatus 100 is provided movable and the mounting table 200 is provided fixed. However, in other embodiments not shown, there may be only one mounting table 200 provided according to actual needs, and the disclosure is not limited thereto. The structure and operation mode of the object conveying system 10 are further described below.

Referring to FIGS. 1A and 1B, in this embodiment, the object conveying apparatus 100 includes a traveling member 110, a vehicle member 120, and a transporting member 130. The traveling rail TR is disposed above the object conveying apparatus 100 in an up-down direction UD (the up-down direction in the drawings of FIGS. 1A and 1B), and the traveling member 110 is configured on the traveling rail TR to move along the traveling direction TD, for example, realizing movement on the traveling rail TR through a driving device that is not shown. The vehicle member 120 is disposed below the traveling member 110 in the up-down direction UD, and includes a horizontal moving mechanism 122 that moves along the horizontal direction HD, and a lifting mechanism 124 that moves along the up-down direction UD. The transporting member 130 is disposed below the lifting mechanism 124, and is used to carry or set down the object O as the lifting mechanism 124 moves downward. Therefore, when the object conveying apparatus 100 stops at a side of the mounting table 200 through the movement of the traveling member 110, the vehicle member 120 moves along the horizontal direction HD through the horizontal moving mechanism 122 and moves along the up-down direction UD through the lifting mechanism 124, allowing the transporting member 130 to approach the mounting table 200. In addition, as shown in FIGS. 1A and 1B, the vehicle member 120 is covered by a shell, and the horizontal moving mechanism 122, the lifting mechanism 124, the transporting member 130, and the object O all enter and exit from the inside of the shell. However, the disclosure is not limited thereto.

Furthermore, in this embodiment, a rail R extending along the horizontal direction HD is configured between the object conveying apparatus 100 and the mounting table 200. As shown in the state change between FIG. 1A and FIG. 1B, the horizontal moving mechanism 122 of the vehicle member 120 moves back and forth along the rail R in the horizontal direction HD between the object conveying apparatus 100 and the mounting table 200 at one side in the horizontal direction HD (that is, the left side of the drawings in FIG. 1A and FIG. 1B). In other embodiments not shown, the horizontal moving mechanism 122 of the vehicle member 120 may also move back and forth along the rail R facing the horizontal direction HD between the object conveying apparatus 100 the mounting table 200 on another side in the horizontal direction HD (i.e., the right side of the drawings in FIG. 1A and FIG. 1B). The disclosure is not limited to the content shown in FIG. 1A and FIG. 1B. That is to say, the subsequent description of the relative position and operation between the object conveying apparatus 100 and the mounting table 200 takes the mounting table 200 at one side in the horizontal direction HD as an example, but may also be applied to the mounting table 200 (if any) of another side in the horizontal direction HD, and the moving direction thereof may be adjusted according to needs (as described later).

Referring to FIGS. 1A to 2, in this embodiment, a first wheel W1 is disposed on one side of the horizontal moving mechanism 122 in the horizontal direction HD (close to the left side of the horizontal moving mechanism 122 in the drawing). A second wheel W2 is disposed on another side (close to the right side of the horizontal moving mechanism 122 in the drawing). The second wheel W2 is provided to prevent a central part of the horizontal moving mechanism 122 from bending due to weight when only the first wheel W1 or the object conveying apparatus 100 supports the horizontal moving mechanism 122, requiring the second wheel W2 to provide auxiliary support. In other embodiments not shown, there may be only the first wheel W1 provided according to actual needs, and the disclosure is not limited thereto.

Furthermore, as shown in FIGS. 2 and 3, the rail R includes a first rail R1 and a second rail R2 having different horizontal heights in the up-down direction UD and extending along the horizontal direction HD. When the horizontal moving mechanism 122 moves in the direction away from the object conveying apparatus 100 in the horizontal direction HD, the first wheel W1 moves along the first rail R1 and the second wheel W2 moves along the second rail R2. In other embodiments not shown, the second wheel W2 may also be suspended in the air without contacting the second rail R2, but the disclosure is not limited thereto. That is to say, the first rail R1 and the second rail R2 are not on the same horizontal plane. That is, a horizontal height position when the first wheel W1 contacts the first rail R1 is different from the horizontal height position when the second wheel W2 contacts the second rail R2. In this way, when the horizontal moving mechanism 122 moves in the direction away from the object conveying apparatus 100 in the horizontal direction HD, even if one end of the horizontal moving mechanism 122 in the horizontal direction HD drops further due to gravity, causing the horizontal moving mechanism 122 to tilt, the above arrangement may allow the horizontal moving mechanism 122 to enter the rail R while maintaining the original tilted posture. In addition, as an example, the rail R includes a bridging portion RR. The bridging portion RR is disposed on a side close to the object conveying apparatus 100 to reduce the height difference and the impact when the first wheel W1 and the second wheel W2 enter the rail R. However, the disclosure does not limit whether the bridging portion RR is provided or not.

It may be seen that in the object conveying apparatus 100 of the object conveying system 10 of this embodiment, the first rail R1 and the second rail R2 are different in horizontal height, and in the horizontal moving mechanism 122 of the vehicle member 120, the first wheel W1 moves along the first rail R1, and the second wheel W2 moves along the second rail R2. In this way, when the horizontal moving mechanism 122 approaches the mounting table 200, the horizontal moving mechanism 122 may move along the first rail R1 via the first wheel W1 in the original tilted posture and be supported by the first rail R1 without changing angle or height suddenly. Accordingly, the object conveying system 10 may keep the vehicle member 120 stably entering into the rail R and reduce the impact when entering the rail R. However, although FIG. 3 shows that the first rail R1 and the second rail R2 are completely horizontal except for the bridging portion RR, the disclosure does not limit the shapes of the first rail R1 and the second rail R2. For example, in other not-shown embodiments, the first rail R1 and the second rail R2 may also be configured as rails with inclined surfaces, and the tilt angle is corrected as the first wheel W1 moves along the first rail R1, but the disclosure is not limited thereto.

Furthermore, in this embodiment, when the horizontal moving mechanism 122 moves in the direction away from the object conveying apparatus 100 in the horizontal direction HD, the horizontal height in the up-down direction UD of one of the first wheel W1 and the second wheel W2 (the first wheel W1 in the embodiments of FIGS. 2 and 3) that is relatively far away from the object conveying apparatus 100 is smaller than the horizontal height in the up-down direction UD of another one of the first wheel W1 and the second wheel W2 (the second wheel W2 in the embodiment of FIG. 2) that is relatively close to the object conveying apparatus 100 (since the one relatively far away from the object conveying apparatus 100 before entering the rail R is greatly affected by gravity and is located at a lower position). Thereby, the first rail R1 is set corresponding to the horizontal height of the first wheel W1, and the second rail R2 is set corresponding to the horizontal height of the second wheel W2. That is to say, in the embodiments of FIGS. 2 and 3, the horizontal height of the first rail R1 in the up-down direction UD is lower than the horizontal height of the second rail R2 in the up-down direction UD. In this way, the horizontal moving mechanism 122 of this embodiment may directly maintain a tilted posture and stably enter the rail R.

In addition, in this embodiment, from the perspective of viewing in the horizontal direction HD, the first wheel W1 and the second wheel W2 are disposed adjacent to each other in the traveling direction TD (as shown by the dotted line in FIG. 2, the first wheel W1 and the second wheel W2 are adjacent to each other). From the perspective of viewing in the up-down direction UD (that is, the perspective of FIG. 2), the first rail R1 and the second rail R2 are disposed adjacent to each other in the traveling direction TD. That is, the first wheel W1 and the second wheel W2 are staggered from each other in the traveling direction TD and are located at different positions in the traveling direction TD, and the first rail R1 and the second rail R2 are staggered from each other in the traveling direction TD and are located at different positions in the traveling direction TD. Accordingly, when the horizontal moving mechanism 122 moves in the direction away from the object conveying apparatus 100 in the horizontal direction HD, the first wheel W1 enters the first rail R1 and the second wheel W2 enters the second rail R2. In addition, from the perspective of viewing in the horizontal direction HD, the first rail R1 and the second rail R2 are formed in a stepped shape with step differences, and carry the horizontal moving mechanism 122 corresponding to the tilted posture of the horizontal moving mechanism 122. In this way, the horizontal moving mechanism 122 of this embodiment may directly maintain the tilted posture and stably enter the rail R. As an example, the first wheel W1 is disposed inside the second wheel W2 in the traveling direction TD, and the first rail R1 is disposed inside the second rail R2 in the traveling direction TD (as shown in FIG. 2). In other embodiments not shown, the first rail R1 and the second rail R2 may also be formed into other appropriate shapes or the relative positions may be changed. For example, when the mounting table 200 at another side is provided, the shapes or the horizontal height position etc. of the first rail R1 and the second rail R2 on another side may be adjusted according to the configuration of the first wheel W1 and the second wheel W2 of the horizontal moving mechanism 122, as long as the horizontal moving mechanism 122 may maintain the original posture and stably enter the rail R, and the disclosure is not limited thereto.

Another embodiment of the disclosure is described in detail below.

Figure 4:
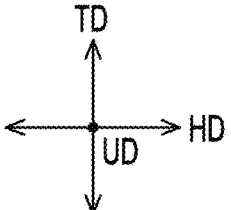
FIG. 4 is a top view of the horizontal moving mechanism of the object conveying apparatus before entering the rail in another embodiment of the disclosure.
Figure 4:
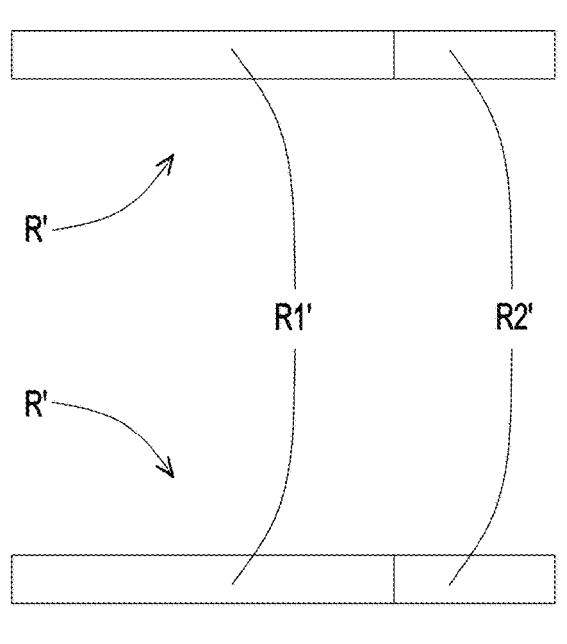
Figure 4:
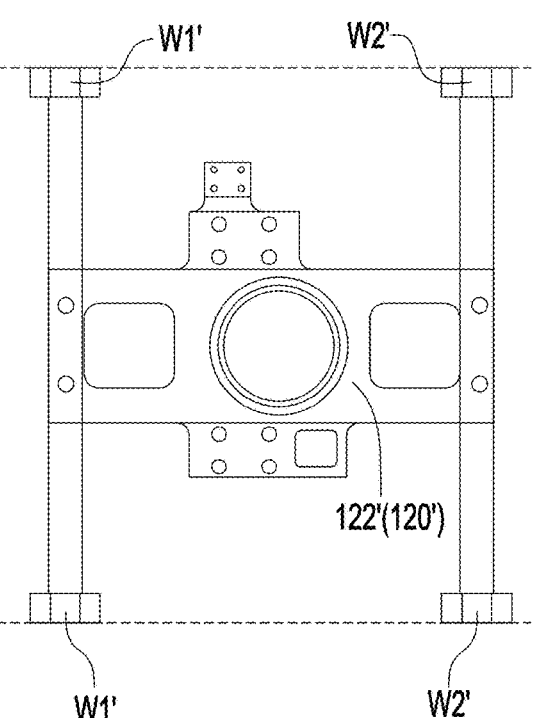
Figures 5A, 5B:
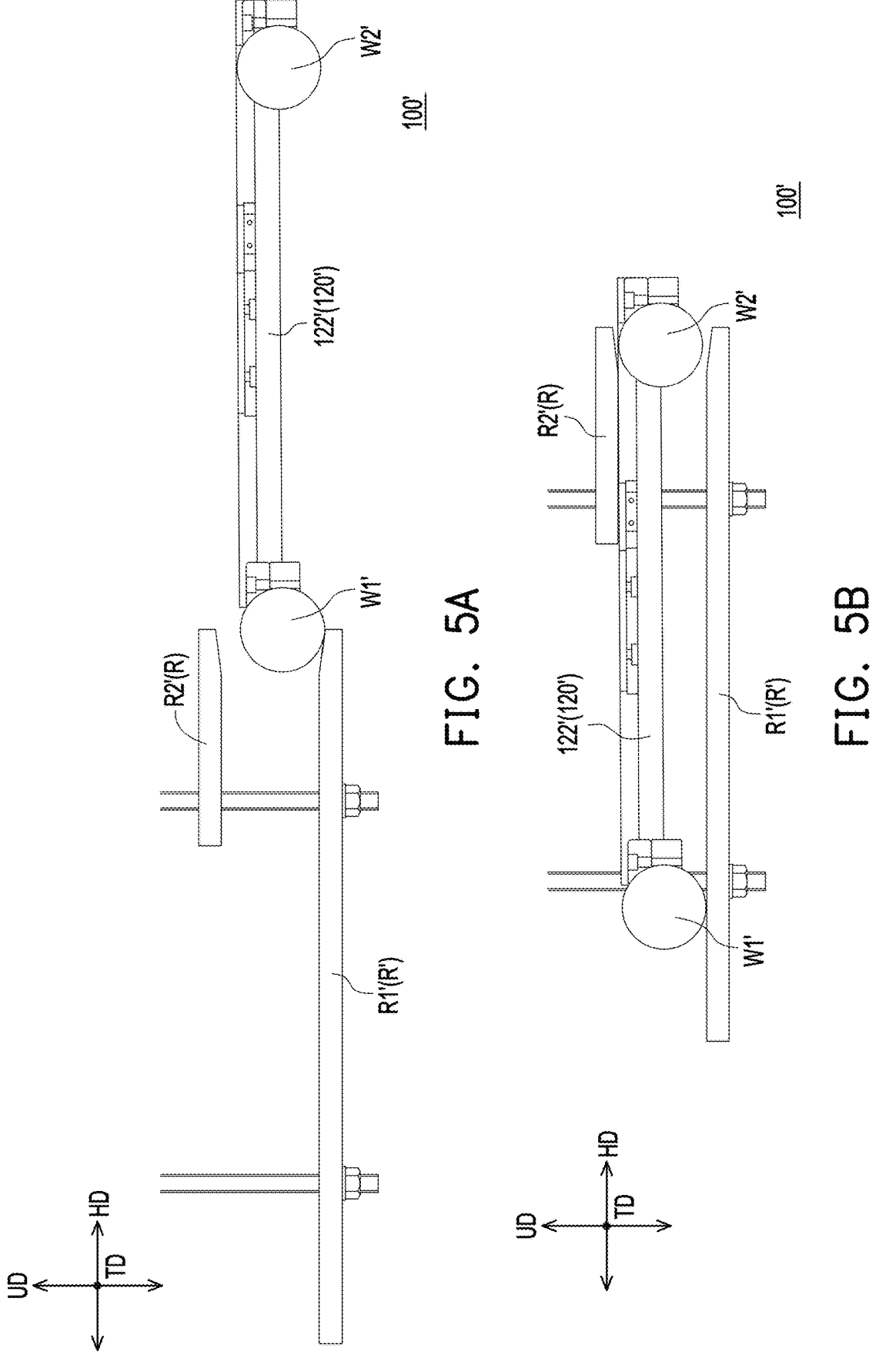
FIGS. 5A and 5B are schematic side views of the process in which the horizontal moving mechanism in FIG. 4 is activated and enters the rail.

FIG. 4 is a top view of the horizontal moving mechanism of the object conveying apparatus before entering the rail in another embodiment of the disclosure. FIGS. 5A and 5B are schematic side views of the process in which the horizontal moving mechanism in FIG. 4 is activated and enters the rail. In this embodiment, a vehicle member 120' of an object conveying apparatus 100' is also applicable to the object conveying system 10 and the mounting table 200 shown in FIGS. 1A and 1B. That is, a horizontal moving mechanism 122' of the vehicle member 120' is provided with a first wheel W1' on one side in the horizontal direction HD (close to the left side of the horizontal moving mechanism 122' in the drawing), and another side in the horizontal direction HD is provided with a second wheel W2' (close to the right side of the horizontal moving mechanism 122' in the drawing). The rail R' includes a first rail R1' and a second rail R2' which have different horizontal heights in the up-down direction UD and extend along the horizontal direction HD. Moreover, when the horizontal moving mechanism 122' moves in the direction away from the object conveying apparatus 100' in the horizontal direction HD, the first wheel W1' moves along the first rail R1', and the second wheel W2' may move along the second rail R2' or be not in contact with the second rail R2' and suspended. Compared with the embodiments shown in FIG. 2 and FIG. 3, the configurations of the first wheel W1' and the second wheel W2', the first rail R1' and the second rail R2' in this embodiment are different. For other unexplained structures, please refer to the description of the foregoing embodiments, which are not repeated herein.

Referring to FIGS. 4 to 5B, in this embodiment, from the perspective of viewing in the horizontal direction HD, the first wheel W1' and the second wheel W2' are at the same position in the traveling direction TD. That is, a connecting direction of the first wheel W1' and the second wheel W2' is parallel to the horizontal direction HD (refer to FIG. 4) so the first wheel W1' and the second wheel W2' are located at the same position in the traveling direction TD. Moreover, from the perspective of viewing in the up-down direction UD (i.e., the perspective of FIG. 4), the second rail R2' is formed within a range that overlaps the first rail R1'. That is, the first rail R1' and the second rail R2' correspond to each other in the up-down direction UD and are located at the same position in the traveling direction TD. Specifically, the part of the first rail R1' close to the object conveying apparatus 100' overlaps the second rail R2', but the disclosure is not limited thereto.

Furthermore, in this embodiment, when the horizontal moving mechanism 122' moves in the direction away from the object conveying apparatus 100' in the horizontal direction HD, the horizontal height in the up-down direction UD of one of the first wheel W1' and the second wheel W2' (the first wheel W1' in the embodiments of FIGS. 4 to 5B) that is relatively far away from the object conveying apparatus 100 is smaller than the horizontal height in the up-down direction UD of another one of the first wheel W1' and the second wheel W2' (the second wheel W2' in the embodiments of FIGS. 4 to 5B) that is relatively close to the object conveying apparatus 100 (since the one relatively far away from the object conveying apparatus 100 before entering the rail R' is greatly affected by gravity and is located at a lower position). Thereby, the horizontal height of the first rail R1' in the up-down direction UD is lower than the horizontal height of the second rail R2' in the up-down direction UD. As an example, the first rail R1' is disposed at a position corresponding to the lower side of the first wheel W1', and the second rail R2' is disposed at a position corresponding to the upper side of the second wheel W2'.

With the above arrangement, as shown in FIG. 5A, when the horizontal moving mechanism 122' moves in the direction away from the object conveying apparatus 100' in the horizontal direction HD, the first wheel W1' first moves along the first rail R1'. Next, as shown in FIG. 5B, after the horizontal moving mechanism 122' enters the mounting table 200, the second wheel W2' moves along the second rail R2' (which may also be suspended in the air without contacting the second rail R2'). That is to say, when the horizontal moving mechanism 122' moves to the mounting table 200 in the direction away from the object conveying apparatus 100' in the horizontal direction HD, the first wheel W1' and the second wheel W2' are located between the first rail R1' and the second wheel W2'. Therefore, in the horizontal moving mechanism 122' of this embodiment, the first wheel W1' located at the lower position due to the influence of gravity first moves along the first rail R1' located below, and then the second wheel W2' located at the upper position moves along the second rail R2' located above, so that the horizontal moving mechanism 122' is clamped by the first rail R1' and the second rail R2' to move stably in an tilted posture. That is to say, when the horizontal moving mechanism 122' moves in the direction away from the object conveying apparatus 100' in the horizontal direction HD, even if one end of the horizontal moving mechanism 122' in the horizontal direction HD drops further due to gravity, causing the horizontal moving mechanism 122' to tilt, the above arrangement enables the horizontal moving mechanism 122' to maintain the original tilted posture and enter the rail R'.

It may be seen that in the object conveying apparatus 100' of the object conveying system 10 of this embodiment, when the horizontal moving mechanism 122' approaches the mounting table 200', the horizontal moving mechanism 122' may move along the first rail R1' via the first wheel W1' in the original tilted posture and be supported by the first rail R1' without changing angle or height suddenly. Accordingly, the object conveying system 10 may keep the vehicle member 120' stably entering into the rail R' and reduce the impact when entering the rail R'. Preferably, the distance between the first rail R1' and the second rail R2' in the up-and-down direction UD is slightly greater than the size of the first wheel W1' (the size of the first wheel W1' is equal to the size of the second wheel W2'). In this way, during the movement of the horizontal moving mechanism 122', the first wheel W1' does not contact the second rail R2', and the second wheel W2' does not contact the first rail R1'. Moreover, after the horizontal moving mechanism 122' moves to the mounting table 200, the first wheel W1' stops on the first rail R1', and the second wheel W2' stops on the second rail R2' (which may also be suspended in the air without contacting the second rail R2'). In other embodiments not shown, the first wheel W1' may also move in a manner of contacting the first rail R1' and the second rail R2' at the same time, moving along the first rail R1' only by first wheel W1'. However, the disclosure is not limited thereto.

To sum up, in the object conveying apparatus of the object conveying system of the disclosure, the first rail and the second rail are different in the horizontal heights. In the horizontal moving mechanism of the vehicle member, the first wheel moves along the first rail, and the second wheel may move along the second rail or be suspended without contact with the second rail. Preferably, the first wheel and the second wheel on the horizontal moving mechanism of the vehicle member are in contact with the rail at different horizontal height positions. In this way, when the horizontal moving mechanism approaches the mounting table, the horizontal moving mechanism may move along the first rail via the first wheel in the original tilted posture and be supported by the first rail without changing the angle or height suddenly. Accordingly, the object conveying system of the disclosure can keep the vehicle member stably entering the rail and reduce the impact when entering the rail.

What is claimed is:

1. An object conveying system, comprising an object conveying apparatus and a mounting table configured adjacent to the object conveying apparatus, wherein the object conveying apparatus comprises:

a traveling member, configured on a traveling rail to move along a traveling direction;

a vehicle member, disposed below the traveling member and comprising a horizontal moving mechanism moving along a horizontal direction and a lifting mechanism moving alone an up-down direction; and a transporting member, disposed below the lifting mechanism, wherein a rail extending along the horizontal direction is disposed between the object conveying apparatus and the mounting table, the horizontal moving mechanism moves back and forth along the rail between the object conveying apparatus and the mounting table in the horizontal direction, and the horizontal moving mechanism is provided with a first wheel on one side in the horizontal direction and a second wheel on another side, the rail comprises a first rail and a second rail having different horizontal heights in the up-down direction and extending along the horizontal direction, in response to the horizontal moving mechanism moving in a direction away from the object conveying apparatus in the horizontal direction, the first wheel moves along the first rail, and the second wheel moves along the second rail.

2. The object conveying system according to claim 1, wherein from a perspective of viewing in the horizontal direction, the first wheel and the second wheel are disposed adjacent to each other in the traveling direction, and from a perspective of viewing in the up-down direction, the first rail and the second rail are disposed adjacent to each other in the traveling direction.

3. The object conveying system according to claim 2, wherein from a perspective of viewing in the horizontal direction, the first rail and the second rail are formed in a stepped shape with step differences.

4. The object conveying system according to claim 1, wherein from a perspective of viewing in the horizontal direction, the first wheel and the second wheel are located at the same position in the traveling direction, and from a perspective of viewing in the up-down direction, the second rail is formed in a range overlapping the first rail, in response to the horizontal moving mechanism moving to the mounting table along the horizontal direction, the first wheel and the second wheel are located between the first rail and the second rail.

* * * * *